United States Patent
Dölle et al.

(10) Patent No.: US 12,540,987 B2
(45) Date of Patent: Feb. 3, 2026

(54) COMMISSIONING MEASURING DEVICES

(71) Applicant: Siemens Aktiengesellschaft, Munich (DE)

(72) Inventors: Oliver Dölle, Erlangen (DE); Thomas Schütz, Fürth (DE); Arvid Amthor, Grabfeld OT Nordheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 308 days.

(21) Appl. No.: 18/260,918

(22) PCT Filed: Nov. 23, 2021

(86) PCT No.: PCT/EP2021/082633
§ 371 (c)(1),
(2) Date: Jul. 10, 2023

(87) PCT Pub. No.: WO2022/152438
PCT Pub. Date: Jul. 21, 2022

(65) Prior Publication Data
US 2024/0085494 A1 Mar. 14, 2024

(30) Foreign Application Priority Data
Jan. 15, 2021 (EP) .................. 21151854

(51) Int. Cl.
*G01R 31/50* (2020.01)
*G01R 19/25* (2006.01)

(52) U.S. Cl.
CPC ......... *G01R 31/50* (2020.01); *G01R 19/2513* (2013.01)

(58) Field of Classification Search
CPC ..... G01R 31/50; G01R 19/2513; G01R 31/67
(Continued)

(56) References Cited

U.S. PATENT DOCUMENTS 7,660,776 B1 * 2/2010 Kious .................. G06N 5/025
706/45
10,637,233 B2 * 4/2020 Hao ...................... H02H 1/0092
(Continued)

FOREIGN PATENT DOCUMENTS

DE  10 2017 222 131   6/2019  ............. G06Q 10/04
DE  10 2019 207 061   11/2020 ............. G05B 13/04

OTHER PUBLICATIONS

Search Report for International Application No. PCT/EP2021/082633, 11 pages, Mar. 29, 2022.
(Continued)

*Primary Examiner* — Giovanni Astacio-Oquendo
(74) *Attorney, Agent, or Firm* — Slayden Grubert Beard PLLC

(57) ABSTRACT

Various embodiments of the disclosure include methods for testing measuring devices n for resources of an energy system assigned to a common measuring device. The method may include: acquiring a measurement signal $P_n(t)$ by way of each of the measuring devices n; acquiring a sum signal $P_{PCC}(t)$ by way of the common measuring device; providing an objective function Z, which defines a difference between the acquired sum signal $P_{PCC}(t)$ and a modeled sum signal $\hat{P}_{PCC}(t)$, wherein the modeled sum signal $\hat{P}_{PCC}(t)$ is formed by way of the acquired measurement signals $P_n(t)$ and a respective scaling factor $S_n$; and computing the values of the scaling factors $S_n$ by extremizing the objective function Z. The test includes determining an error with one of the measuring devices n through a deviation of the computed value of the associated scaling factor $S_n$ from a value defined for the respective measuring device n.

12 Claims, 1 Drawing Sheet

(58) Field of Classification Search
USPC .......................................... 324/600, 601, 606
See application file for complete search history.

(56) References Cited

U.S. PATENT DOCUMENTS

| | | | |
|---|---|---|---|
| 10,797,479 B2* | 10/2020 | Morgan | H02H 1/0092 |
| 10,931,097 B2* | 2/2021 | Chowdhury | H02H 3/52 |
| 2018/0106851 A1* | 4/2018 | Schweitzer, III | H02H 7/261 |
| 2021/0165921 A1 | 6/2021 | Kautz | G06F 30/10 |
| 2025/0110189 A1* | 4/2025 | Cantrell | G01R 19/16547 |

OTHER PUBLICATIONS

Search Report for EP Application No. 21151854.3, 7 pages, Jun. 15, 2021.

* cited by examiner

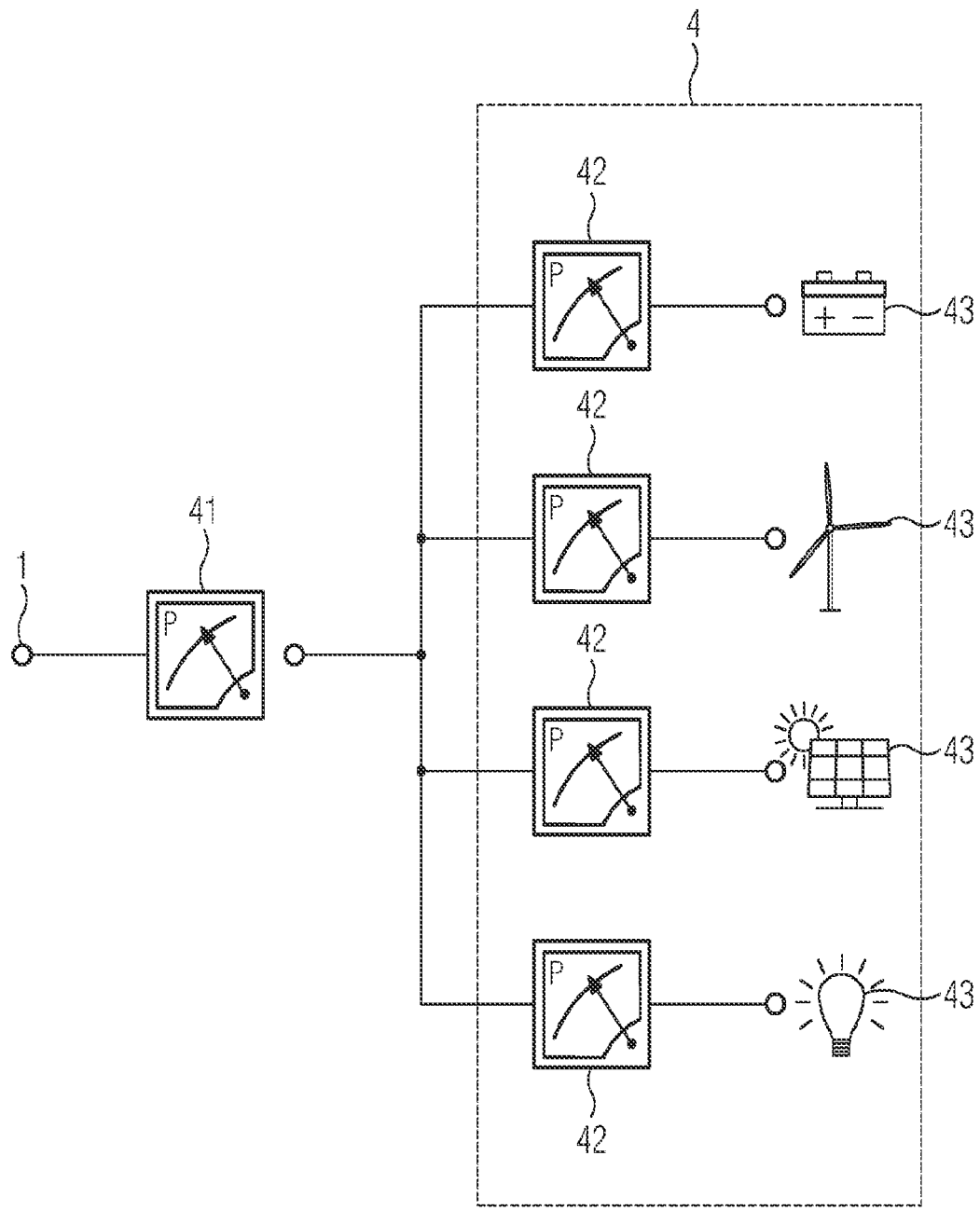

COMMISSIONING MEASURING DEVICES

CROSS-REFERENCE TO RELATED APPLICATIONS

This application is a U.S. National Stage Application of International Application No. PCT/EP2021/082633 filed Nov. 23, 2021, which designates the United States of America, and claims priority to EP Application No. 21151854.3 filed Jan. 15, 2021, the contents of which are hereby incorporated by reference in their entirety.

TECHNICAL FIELD

The present disclosure relates to energy systems. Various embodiments of the teachings herein include methods and/or systems for commissioning and/or operating energy systems.

BACKGROUND

Energy systems containing multiple resources, in particular containing multiple multimodal generators (energy generators), storage units (energy storage units) and loads (energy consumers), are typically individual solutions, meaning that they require significant commissioning effort due to their complexity and uniqueness. During operation, the individual resources of the energy system, for example refrigerators, storage units or engine-based cogeneration plants, may be controlled using local, heuristic rules. Due to the complexity of multimodal energy systems, however, such heuristic operating strategies for the individual resources do not lead to optimum operational management of the overall system, that is to say of the energy system.

Using a superordinate, model-based energy management system (EMS) enables improved and optimized operational management of the energy system. In this case, an EMS, which is central with regard to the resources of the energy system, transfers optimum setpoint value specifications to subordinate basic controls, which finally adjust the available resources to these operating points.

Feedback or information about the current system status of the individual resources to the EMS is necessary to ensure efficient and as far as possible error-free operation of the energy system. This information, for example energy currently being converted by energy consumers and/or energy conversion installations, and/or energy obtained within the energy system, for example by way of a photovoltaic installation, is typically acquired by way of associated sensors. Furthermore, input powers or output powers of the resources and/or energy system components are required in order for the EMS to be able to model as precisely as possible (parameter identification). However, in contrast to heuristic controls, this means that more sensors are required, which leads to a significantly higher effort for the commissioning of the EMS.

In other words, the measuring devices associated with the EMS, in particular sensors or meters, have to be installed and integrated. Errors may occur here, since for example the individual work steps in this regard are performed by different companies and there are typically not enough aids to check the measuring points or measuring apparatuses.

For pre-existing energy systems that are operated for example by way of heuristic control/regulation, a large number of the measuring apparatuses that may already be installed are typically not required, meaning that errors made during installation and/or parameterization thereof may remain undetected even over longer periods of time. If such energy systems are integrated into a model-based EMS, this leads to inefficient or incorrect operation, since the regulation takes place based on incorrect information transmitted to the EMS.

Typically, it is up to the person commissioning the EMS to manually check the above-mentioned difficulties and correct any errors that are detected. However, due to the large number of resources present within complex energy systems, errors often remain undetected in this case. As a result, the EMS does not operate the associated energy system in an optimum manner.

SUMMARY

The teachings of the present disclosure provide improved testing of multiple measuring devices in an energy system, in particular with regard to EMS-based regulation of the energy system. For example, some embodiments include a method for testing one or more measuring devices n (42) for resources (43) of an energy system (4), wherein the measuring devices n (42) are assigned to a common measuring device (41), including: acquiring a measurement signal $P_n(t)$ by way of each of the measuring devices n (42); acquiring a sum signal $P_{PCC}(t)$ by way of the common measuring device (41); providing an objective function Z, which defines a difference between the acquired sum signal $P_{PCC}(t)$ and a modeled sum signal $\hat{P}_{PCC}(t)$, wherein the modeled sum signal $\hat{P}_{PCC}(t)$ is formed by way of the acquired measurement signals $P_n(t)$ and a respective scaling factor $S_n$; and computing the values of the scaling factors $S_n$ by extremizing the objective function Z; wherein the test is carried out by determining an error with one of the measuring devices n through a deviation of the computed value of the associated scaling factor $S_n$ from a value defined for the respective measuring device n (42).

In some embodiments, the modeled sum signal $\hat{P}_{PCC}(t)$ is formed by way of $\hat{P}_{PCC}(t) = \Sigma_n S_n \cdot P_n(t)$.

In some embodiments, the scaling factor $S_n$ for each of the measuring devices n (42) is formed such that it has a value from a set $\{f(k)\}_{k \in K}$ of operating parameters of the measuring device n (42), which set is associated with the respective measuring device n (42).

In some embodiments, the operating parameters of a measuring device n (42) comprise one or more operating parameters able to be set during commissioning of the measuring device n (42) and/or one or more installation parameters of the measuring device n (42).

In some embodiments, the set $\{f(k)\}_{k \in K}$ comprises one or more permutations of mathematical signs and unit prefixes of the measurement signal $P_n(t)$ from the respective measuring device n (42).

In some embodiments, the set $\{f(k)\}_{k \in K}$ comprises at least the unit prefixes $-1, -10^3$ and $-10^6$ as well as $1, 10^3$ and $10^6$.

In some embodiments, the set $\{f(k)\}_{k \in K}$ comprises one or more current transformer factors and/or one or more specific thermal capacities.

In some embodiments, the scaling factor $S_n$ associated with one of the measuring devices n (42) is formed by $S_n = \Sigma_{k \in K} x_n(k) \cdot f(k)$, wherein $x_n(k)$ is a Boolean selection function that assigns each measuring device n (42) exactly one value $f(k)$ from the set $\{f(k)\}_{k \in K}$ associated with the measuring device n (42).

In some embodiments, the objective function is extremized using the constraint $\Sigma_{k \in K} x_n(k) = 1$, with $x_n(k) \in \{0,1\}$.

In some embodiments, the selection functions $x_n(k)$ for all measuring devices n (42) are defined by the extremizing of the objective function Z.

In some embodiments, $Z=\Sigma_{t\in T}|P_{PCC}(t)-\hat{P}_{PCC}(t)|$ is used as objective function.

In some embodiments, the absolute value of the difference $|P_{PCC}(t)-\hat{P}_{PCC}(t)|$ is formed by way of two positive error variables $e_{PCC}^{\pm}(t)\geq 0$ through $e_{PCC}^{+}(t)+e_{PCC}^{-}(t)$, wherein $P_{PCC}(t)-\hat{P}_{PCC}(t)=e_{PCC}^{+}(t)-e_{PCC}^{-}(t)$.

In some embodiments, an electricity meter or a heat meter is used in each case as measuring device n (42), wherein the measurement signals $P_n(t)$ are formed by time characteristics of the respective powers.

As another example, some embodiments include a method for commissioning multiple measuring devices n (42) for resources (43) of an energy system (4), wherein each resource (43) is assigned one of the measuring devices n (42) so as to acquire a measurement signal $P_n(t)$ associated with its energy consumption and/or its energy generation, and having a common measuring device (41) common to the measuring devices n (42), by way of which common measuring device a common measurement signal $P_{PCC}(t)$ common to the resources (43) is able to be acquired, wherein, during commissioning, the measuring device n (42) is tested with regard to its respective operating parameters, characterized in that the testing of the measuring devices n (42) is performed as described herein.

In some embodiments, the testing comprises respective unit prefixes and/or mathematical signs of the measurement signals $P_n(t)$ acquired by the measuring devices n (42).

BRIEF DESCRIPTION OF THE DRAWINGS

Further advantages, features and details of the teachings herein are apparent from the exemplary embodiments described below and with reference to the drawing. The sole FIGURE in this case shows a schematic energy system containing multiple resources.

DETAILED DESCRIPTION

Example methods incorporating teachings of the present disclosure for testing one or more measuring devices n for resources of an energy system, wherein the measuring devices n are assigned to a common measuring device, may include:

acquiring a measurement signal $P_n(t)$ by way of each of the measuring devices n;

acquiring a sum signal $P_{PCC}(t)$ by way of the common measuring device;

providing an objective function Z, which defines a difference between the acquired sum signal $P_{PCC}(t)$ and a modeled sum signal $\hat{P}_{PCC}(t)$, wherein the modeled sum signal $\hat{P}_{PCC}(t)$ is formed by way of the acquired measurement signals $P_n(t)$ and a respective scaling factor $S_n$; and computing the values of the scaling factors $S_n$ by extremizing the objective function Z; wherein the test is carried out by determining an error with one of the measuring devices n through a deviation of the computed value of the associated scaling factor $S_n$ from a value defined for the respective measuring device n.

The methods and/or systems incorporating teachings of the present disclosure may be computer-aided. In this case, the methods or any of their elements may be performed by a module of an energy management system. In other words, an energy management system may comprises a module designed to perform one or more of the methods described herein.

The measurement signals and the sum measurement signal may each be a timeseries formed with respect to a defined discretization. The discretization may be a day, an hour, a quarter of an hour or a shorter period of time.

Some embodiments include an energy system containing multiple resources, wherein each of the n resources is assigned one of the measuring devices. Furthermore, the measuring devices are assigned to the common measuring device. For example, the generation and/or the consumption of each resource is acquired by way of the measuring device associated with the resource. In this exemplary embodiment, a total generation and/or a total consumption of the resources is acquired by the common measuring device. However, provision may be made for other measured variables. Furthermore, it is not necessary in principle for all of the resources of the energy system to have an associated measuring device. The test may thus be restricted to a subsystem of the energy system. In this case, it could be defined, for example by an operator of the energy system, which resources or which measuring device should be included. However, all resources of the energy system that relate to the generation and consumption of energy may be included in the test.

From a structural viewpoint, the IPCC Fifth Assessment Report in particular defines an energy system as: "All components related to the generation, conversion, delivery and use of energy." The energy system may comprise a building, for example an office building and/or a residential building, an industrial installation, a campus, a district, a municipality and/or the like.

In some embodiments, the energy system comprises electricity generators, combined heat and power systems, in particular engine-based cogeneration plants, gas boilers, diesel generators, electric boilers, heat pumps, compression refrigerators, absorption refrigerators, pumps, district heating networks, energy transfer lines, wind turbines or wind power installations, photovoltaic installations, biomass installation, biogas installations, waste incineration installations, industrial installations, conventional power plants and/or the like as resources.

Errors in the sense of the disclosure are in particular errors that may occur during the setup or installation of the measuring device, during the local configuration of the measuring device and/or during the integration the measuring device into the EMS, for example by way of a network protocol. One installation error is for example installing the measuring device in the wrong direction. One error that may occur during the local configuration of the measuring device is incorrect parameterization and/or incorrect specification of technical parameters that are required for the EMS, for example a current transformer ratio and/or a specific thermal capacity of a fluid to be measured. One error when integrating the measuring device may be an incorrectly set unit prefix and/or an incorrectly set mathematical sign with regard to the convention within the energy system (overall system).

Typical errors are different and/or incorrect mathematical signs, incorrect or incorrectly set unit prefixes and/or incorrect specification of parameters.

In some embodiments, a measurement signal, for example a power characteristic, is acquired for each measuring device. In the present disclosure, acquisition is also understood to mean provision. A sum signal, for example an overall power characteristic of resources, is acquired by way of the common measuring device, for example at a grid connection point (Point of Common Coupling; PCC). The respective power characteristics may have positive and negative mathematical signs with regard to generation and consumption.

In some embodiments, an objective function (or loss function or cost function) is provided for a mathematical optimization, which is typically carried out numerically. In this case, the provided objective function quantifies or models a difference between the acquired sum signal and a modeled sum signal. The modeled sum signal is formed by way of the individual measurement signals from the measuring devices and the scaling factor. In this case, the scaling factor basically models errors, in particular errors that relate to the parameterization of the respective measuring device.

In some embodiments, the respective scaling factor, which is associated with the respective measuring device, is determined by way of the optimization, that is to say by extremizing the objective function. In other words, all scaling factors are determined by maximizing or minimizing the objective function. Since the objective function defines the difference between the acquired sum signal and the modeled sum signal, which comprises the scaling factors, provision is made to minimize the objective function, that is to say to minimize the absolute error between the acquired sum signal and the modeled sum signal. In other words, the scaling factors of the modeled sum signal are defined such that the modeled sum signal corresponds as precisely as possible to the acquired sum signal. In this case, even the modeled sum signal is based on actually acquired or real measurement signals, namely the measurement signals from the measuring devices assigned to the resources.

Some embodiments use an optimization in the test. This is the case because, alternatively, for example, all possibilities (permutations) of unit prefixes and mathematical signs could be determined and each permutation could be tested individually. However, for more complex energy systems, for example containing more than 20 resources, this quickly leads to enormous computing times (more than 3000 years), which is no longer realistically manageable. An optimization incorporating teachings of the present disclosure enables sufficiently precise testing in workable computing times.

In some embodiments, the respective measuring device is tested with regard to an installation error, a parameterization error and/or an integration error by comparing the scaling factor determined or computed by way of the optimization with a value defined for the respective measuring device. In this case, the value defined for the respective measuring device indicates an error-free measuring device. In other words, an error, in particular an installation error, an installation error and/or an integration error, with the measuring device is identified by virtue of the determined scaling factor deviating from its defined value. For example, the value for one or more of the measuring devices, in particular for all of the measuring devices, is defined numerically by the number one. If the determined or computed scaling factor for one of the measuring devices then has a value other than one, then there is an error with the measuring device, it additionally being possible to infer the type of error from the value of the computed scaling factor. In particular, if a unit error is present, then the computed scaling factor may for example have the value 1000 instead of the value 1. In particular, the scaling factors therefore have only discrete values.

In some embodiments, the methods include performing a test on a plurality of measuring devices of an energy system, such that the plausibility of the associated measurement signals is able to be checked. This automated plausibility check significantly reduces commissioning effort with regard to energy management systems. Errors, in particular an installation error, a parameterization error and/or an integration error, may be detected with virtual certainty. This ensures that the energy system is operated efficiently and as optimally as possible by the associated energy management system, to which the measuring devices and resources are connected.

It is additionally possible to identify the type of error, such that associated solution possibilities are able to be provided. This allows an error to be rectified quickly. Furthermore, the present invention enables fully automatic error handling.

Some embodiments include a method for commissioning multiple measuring devices n for resources of an energy system, wherein each resource is assigned one of the measuring devices n so as to acquire a measurement signal $P_n(t)$ associated with its energy consumption and/or its energy generation, and having a common measuring device common to the measuring devices n, by way of which common measuring device a common measurement signal $P_{PCC}(t)$ common to the resources is able to be acquired, wherein, during commissioning, the measuring device n is tested with regard to its respective operating parameters, includes the testing of the measuring devices n is performed as described herein.

In some embodiments, the testing comprises respective unit prefixes and/or mathematical signs of the measurement signals $P_n(t)$ acquired by the measuring devices n.

Advantages and embodiments of the commissioning methods incorporating teachings of the present disclosure arise, which are similar and equivalent to those of the testing methods described herein.

In some embodiments, the modeled sum signal $\hat{P}_{PCC}(t)$ is formed by way of $\hat{P}_{PCC}(t) = \Sigma_n S_n \cdot P_n(t)$. In other words, the scaling factor $S_n$ scales or weights the associated acquired measured signal $P_n(t)$ in the sum of the acquired measurement signals. In the error-free case, the acquired sum signal from the common measuring device should match the sum of the individual measurement signals within the scope of the measurement deviations. An error may thus be identified by a scaling factor different from the value 1.

In some embodiments, the scaling factor $S_n$ for each of the measuring devices n is formed such that it has a value from a set $\{f(k)\}_{k \in K}$ of operating parameters of the measuring device n, which set is associated with the respective measuring device n. The scaling factor of a measuring device thus has a value that is associated with a possible installation/operation of the measuring device. The set $\{f(k)\}_{k \in K}$ in this case thus describes possible errors with the respective measuring device. By way of example, $f(1)=1$ and $f(2)=-1$, and so $\{f(k)\}_{k \in K} = \{-1, 1\}$. Mathematical sign errors with the respective measuring device are thus modeled in this simple example. The set $\{f(k)\}_{k \in K}$ thus corresponds to the operating possibilities of the respective measuring device, wherein the concept of operating possibilities is quantified by the stated operating parameters and represented or modeled mathematically by the set $\{f(k)\}_{k \in K}$.

It is not necessary here for the set $\{f(k)\}_{k \in K}$ to comprise every operating possibility of the measuring device. It is sufficient for the set $\{f(k)\}_{k \in K}$ to comprise the most likely errors or operating possibilities or operating parameters of the respective measuring device. The index set K (subset of the natural numbers) and thus the set $\{f(k)\}_{k \in K}$ may thus in principle be dependent on the measuring device n. In other words, the measuring devices may have different operating possibilities/operating parameters that may each lead to different errors. Typical errors that all measuring devices may exhibit and that may be described by the same set $\{f(k)\}_{k\in K}$ are mathematical sign errors and unit prefix errors.

For example, $\{-1000000, -1000, -1, 1, 1000, 1000000\}$ is one possible set $\{f(k)\}_{k\in K}$ that comprises specific unit prefixes, here kilo and mega, with respective mathematical signs ± for typical measuring devices (as a permutation). In other words, the function $f(k)$ assigns every permutation k of operating parameters an associated numerical value. Furthermore, it is not necessary for this value to be an integer value—as in the exemplary embodiment mentioned above. Real values, in particular rational values, may be provided. This is the case because the operating possibilities or operating parameters may also comprise physical or technical parameters and variables that are to be set, for example during commissioning. For example, these comprise a specific thermal capacity for a fluid and/or a current transformer ratio. Other permutation possibilities, for example multiplication with British units of measurement and/or scaling with standardized variables, for example in the case of current transformers, may be modeled by $f(k)$ and taken into consideration by $\{f(k)\}_{k\in K}$.

In some embodiments, the operating parameters of a measuring device n comprise one or more operating parameters able to be set during commissioning of the measuring device n and/or one or more installation parameters of the measuring device n. In particular during commissioning of the measuring device, it is necessary to determine errors with regard to its installation, its parameterization and/or its integration into an EMS. The respective parameters are typically set during commissioning of the respective measuring device. It is thus advantageous to take these commissioning possibilities into consideration when testing for errors according to the present invention and/or one of its embodiments.

In some embodiments, the set $\{f(k)\}_{k\in K}$ comprises one or more permutations of mathematical signs and unit prefixes of the measurement signal $P_n(t)$ from the respective measuring device n. As already mentioned above, typical errors are due to an incorrectly defined mathematical sign and/or an incorrectly set or defined unit prefix (prefixes for units of measurement, unit prefixes).

Advantageously, such typical and commonly occurring errors may be taken into consideration by the set $\{f(k)\}_{k\in K}$ by virtue of this comprising the associated numerical values. This is the case because the scaling factor of a measuring device adopts values within the set $\{f(k)\}_{k\in K}$. The measurement signal associated with the measuring device is thus scaled or weighted accordingly within the modeled sum signal.

In some embodiments, the set $\{f(k)\}_{k\in K}$ comprises at least the unit prefixes $-1, -10^3$ and $-10^6$ as well as $1, 10^3$ and $10^6$. Typical operating or setting parameters of the respective measuring device are thereby advantageously included, meaning that typical or common errors are able to be identified or determined.

In some embodiments, the set $\{f(k)\}_{k\in K}$ comprises one or more current transformer factors (current transformer ratios) and/or one or more specific thermal capacities. It is thereby advantageously possible to check measuring devices for current transformers and/or measuring devices for fluids, for example for acquiring an associated heat output, for errors in the sense of the present invention.

In some embodiments, the scaling factor $S_n$ associated with one of the measuring devices n is formed by $S_n = \Sigma_{k\in K} x_n(k) \cdot f(k)$, wherein $x_n(k)$ is a Boolean selection function that assigns each measuring device n exactly one value $f(k)$ from the set $\{f(k)\}_{k\in K}$ associated with the measuring device n. This provides a particularly advantageous scaling factor for each of the measuring devices. The advantageous Boolean selection function in particular adopts only two values, for example 0 and 1, meaning that it indicates, and in this sense selects, a value from the set $\{f(k)\}_{k\in K}$. Exactly one value is particularly preferably selected.

In some embodiments, the objective function to be extremized uses the constraint $$\Sigma_{k\in K} x_n(k) = 1, \text{ with } x_n(k) \in \{0,1\}.$$

This ensures that each measuring device or each scaling factor is assigned only one value from the set $\{f(k)\}_{k\in K}$. This makes technical sense because a measuring device typically does not have two mathematical signs and/or two unit prefixes. The abovementioned embodiment of the scaling factor and the mentioned condition thus ensure the technical requirement that a measuring device is able to be installed or parameterized in only one way.

In some embodiments, the selection functions $x_n(k)$ for all measuring devices n may be defined by the extremizing of the objective function Z. In other words, the optimization, that is to say the extremizing of the objective function, is used to determine which operating parameters, for example with regard to mathematical signs and/or unit prefixes, the respective measuring device has. The value $f(k)$ is thereby likewise determined from the set $\{f(k)\}_{k\in K}$, meaning that it is thereby possible to establish in particular whether there is an error with the respective measuring device. If the determined value $f(k)$ deviates from an intended defined value of the measuring device, then there is an error with the measuring device. For example, the measured values of the measuring device should only be positive. If a negative value of $f(k)$ is then determined for this measuring device through the optimization, then there is a mathematical sign error with said measuring device. In this exemplary embodiment, the measuring device could thus have been installed or connected in the wrong direction.

In some embodiments, $Z = \Sigma_{t\in T} |P_{PCC}(t) - \hat{P}_{PCC}(t)|$ is used as objective function. In other words, the objective function measures the absolute difference between the acquired sum signal $P_{PCC}(t)$ and the modeled sum signal $\hat{P}_{PCC}(t)$. The modeled sum signal comprises the scaling factors, by way of which it is possible to determine possible errors with the respective measuring devices, and also the acquired individual measurement signals. Said objective function thus technically ensures that the scaling factors or the selection functions are defined such that the error, that is to say the absolute deviation between the acquired sum signal and the modeled sum signal, is as small as possible. The scaling factors or the associated selection functions may thereby advantageously be determined. If for example all scaling factors have the value 1 as a result of being determined by way of the optimization, then all measuring devices are recognized as error-free within the course of the present test.

In some embodiments, the absolute value of the difference $|P_{PCC}(t) - \hat{P}_{PCC}(t)|$ in the objective function Z is formed by way of two positive error variables $e_{PCC}^{\pm}(t) \geq 0$ through $e_{PCC}^+(t) + e_{PCC}^-(t)$, wherein $P_{PCC}(t) - \hat{P}_{PCC}(t) = e_{PCC}^+(t) - e_{PCC}^-(t)$. The absolute value (1-norm) within the objective function $Z = \Sigma_{t\in T} |P_{PCC}(t) - \hat{P}_{PCC}(t)|$ is numerical, that is to say disadvantageous in the numerical extremizing of the objective function (optimization). The absolute value function for the numeric may be resolved by said error variables, which adopt only positive values (positive). This in particular saves computing time. Provision may be made for additional objective functions, for example those formed by way of the 2-norm.

In some embodiments, said optimization problem may be performed multiple times in succession. In other words, multiple solutions (values of the scaling factors or of the selection functions) are computed, such that it is possible to generate a pool of operating parameters, in particular of mathematical signs and/or unit prefixes. The constraint of the optimization in this case requires the previous solution not to be present. It is thereby possible to determine solutions (neighbor solutions) that are close to the original solution. This may be advantageous whenever different combination possibilities of operating parameters essentially lead to the same solution, meaning that further analysis or targeted determination is required. This results in a more complete picture, which makes it possible to determine the solution that appears most plausible.

In some embodiments, if there are multiple equal solutions, to formulate the optimization problem such that the number of possible changes to the current configuration is minimized. It is assumed here that at least a certain portion of the set operating parameters is correct. In this case, the objective function first needs to be formed by $\Sigma_{n=1}^{N} e(n)$ and minimized within the course of the optimization. In this case, $e(n)$ models the difference in relation to a current configuration. Furthermore, the constraints $\Sigma_{t \in T}(e_{PCC}^{+}(t) + e_{PCC}^{-}(t)) \leq z$ and $\hat{x}_n(k) - x_n(k) \geq e(n)$ for all values of n, k, with $\hat{x}_n(k)=1$ are necessary and need to be taken into consideration. The constraint $\Sigma_{t \in T}(e_{PCC}^{+}(t) + e_{PCC}^{-}(t)) \leq z$ ensures that the objective function value z does not worsen. In this case, a factor $\lambda > 1$ with $\Sigma_{t \in T}(e_{PCC}^{+}(t) + e_{PCC}^{-}(t)) \leq \lambda z$ could likewise be provided. The additional constraint indicates the deviation between the original parameterization (configuration) $\hat{x}_n(k)$ and a possible solution $x_n(k)$ to the optimization problem.

In some embodiments, an electricity meter or a heat meter is used in each case as measuring device n, wherein the measurement signals $P_n(t)$ are formed by time characteristics of the respective powers. This makes it possible to test typical and known measuring devices, in particular meters, with regard to their installation, their parameterization and/or their integration into the regulation of the associated energy system, in particular into an energy management system.

Identical, equivalent or functionally identical elements may be provided with the same reference signs in one of the figures or throughout the figures. The FIGURE schematically shows an energy system 4 containing multiple resources 43. A measuring device 42 is assigned to each of the resources 43, wherein the respective measuring device 43 acquires the respective energy production and/or energy generation, for example via power characteristics, in the form of a respective measurement signal. By way of example and non-exhaustively, the energy system 4 has a battery storage unit, a wind turbine, a photovoltaic installation and an energy consumer as resources 43.

Provision is also made for a common measuring device 41 common to the measuring devices 42. The common measuring device 41 acquires, for example at a grid connection point 1 of the energy system 4, a common measurement signal, for example a total energy production and/or total energy consumption in relation to the resources 43. The common measurement signal may in turn be in the form of a power characteristic.

If an energy management system is provided for the illustrated energy system 4, then it needs to be ensured, in particular during commissioning of the energy management system and/or during commissioning of the measuring devices 42, that they are installed, parameterized and/or integrated correctly. In other words, it is necessary to test the measuring devices, in particular with regard to their technical installation, their technical parameterization and/or their technical integration into the overall system or into the energy management system.

To test the measuring devices, individual measurement signals $P_n(t)$ from the measuring devices n are acquired and/or provided. Furthermore, according to the illustrated embodiment, a common measurement signal $P_{PCC}(t)$ is acquired and/or provided at the grid connection point 1 of the energy system 4. The measurement signals $P_n(t)$, $P_{PCC}(t)$ are typically timeseries of the respective power present at the measurement location, in particular of an electric or thermal power. The measurement signals or the timeseries are acquired over a time range T. Provision is typically made here for a time resolution of 15 minutes, with larger time ranges possibly being provided for thermal loads due to their inertia. In other words, the time range T is preferably subdivided into 15 minute increments.

In some embodiments, an objective function defines or models a difference, in particular the absolute difference, between the acquired sum signal $P_{PCC}(t)$ and a modeled sum signal $\hat{P}_{PCC}(t)$. In the present embodiment, the modeled sum signal is formed by way of the acquired measurement signals $P_n(t)$ and a respective scaling factor $S_n$. In some embodiments, the scaling factors are not time-dependent. In other words, the modeled sum signal is dependent on the combination $S_n \cdot P_n(t)$, that is to say the individual measurement signals $P_n(t)$ are scaled. It comprises typical errors, such as for example mathematical sign errors and/or errors in the unit prefix, which represent a scaling of the respective measured value.

In some embodiments, scaling factors are given by $S_n = \Sigma_{k \in K}(x_n(k) \cdot f(k))$. In this case, $x_n(k)$ is a Boolean selection function (or binary decision variable) that assigns each measuring device or each scaling factor exactly one value $f(k)$. This unambiguous assignment may be ensured by the constraint $1 = \Sigma_{k \in K} x_n(k)$. The function $f(k)$ is a numerical value assigned to a permutation of operating possibilities k and thus possible error sources k. By way of example, the function $f(k)$ for mathematical signs and unit prefixes has the form $f(-m) = -10^m$ and $f(m) = 10^m$ with integer values $m \geq 0$. If for example only the unit prefixes kilo and mega are taken into consideration with their respective mathematical signs, then m=0, 3 and 6. Further indices, in particular mathematically equivalent ones, may be provided.

In some embodiments, the selection functions or the decision variables $x_n(k)$ are determined by minimizing the objective function, that is to say by way of an optimization method. As a result, exactly one operating possibility, that is to say here one possible combination of mathematical sign and unit prefix, is assigned for each of the measuring devices 42. In other words, for each measuring device 42, its mathematical sign and its unit prefix are determined by way of the optimization such that the absolute difference between the actually acquired sum signal and the modeled sum signal is minimal. If the combination of mathematical sign and unit prefix (scaling factor) determined in this way for one of the measuring devices 42 deviates from a mathematical sign and unit prefix (defined or intended scaling factor) defined or intended beforehand for this measuring device, an error is present according to the present embodiment, for example with the installation, the parameterization and/or with the integration of the measuring device 42.

The optimization problem on which the testing of the measuring devices is based may, according to the present embodiment, be summarized as follows using seven equations:

$$\min \sum_{t \in T}(e^+_{PCC}(t) + e^-_{PCC}(t)). \quad (1)$$

$$P_{PCC}(t) - \hat{P}_{PCC}(t) = e^+_{PCC}(t) - e^-_{PCC}(t) \quad \forall\, t. \quad (2)$$

$$\hat{P}_{PCC}(t) = \sum_{n=1}^{N} \hat{P}_n(t) \quad \forall\, t. \quad (3)$$

$$\hat{P}_n(t) = P_n(t) \cdot \sum_{k \in K}(x_n(k) \cdot f(k)) \quad \forall\, n, t. \quad (4)$$

$$1 = \sum_{k \in K} x_n(k) \quad \forall\, n. \quad (5)$$

$$e^+_{PCC}(t), e^-_{PCC}(t) \geq 0 \quad \forall\, t. \quad (6)$$

$$x_n(k) \in \{0; 1\} \quad \forall\, n, k. \quad (7)$$

In some embodiments, the test makes it possible to automatically identify errors and their type. This significantly improves and simplifies the commissioning of the measuring devices 42 or of the associated energy system or of the associated energy management system.

Although the teachings of the present disclosure has been described and illustrated in more detail by way of the exemplary embodiments, the scope of the disclosure is not restricted by the disclosed examples or other variations may be derived therefrom by a person skilled in the art without departing from the scope of protection.

LIST OF REFERENCE SIGNS

1 Grid connection point
4 Energy system
41 Common measuring device
42 Measuring device
43 Resources

What is claimed is:

1. A method for commissioning an energy system with multiple resources including multimodal generators, storage units, loads, and one or more measuring devices n assigned to the multiple resources and assigned to a common measuring device, the method comprising:
acquiring a measurement signal $P_n(t)$ by way of each of the measuring devices n;
acquiring a sum signal $P_{PCC}(t)$ by way of the common measuring device;
providing an objective function Z, which defines a difference between the acquired sum signal $P_{PCC}(t)$ and a modeled sum signal $\hat{P}_{PCC}(t)$, wherein the modeled sum signal $\hat{P}_{PCC}(t)$ is formed by way of the acquired measurement signals $P_n(t)$ and a respective scaling factor $S_n$;
computing the values of the scaling factors $S_n$ by extremizing the objective function Z; and
using the computed values of the scaling factors $S_n$ to set one or more operating parameters and/or one or more installation parameters for each of the one or more measuring devices n during commissioning of the energy system;
wherein the test includes determining an error with one of the measuring devices n through a deviation of the computed value of the associated scaling factor $S_n$ from a value defined for the respective measuring device n.

2. The method as claimed in claim 1, wherein the modeled sum signal is determined according to $\hat{P}_{PCC}(t)=\Sigma_n S_n \cdot P_n(t)$.

3. The method as claimed in claim 1, wherein the scaling factor $S_n$ for each of the measuring devices n has a value from a set $\{f(k)\}_{k \in k}$ of operating parameters of the measuring device n, which set is associated with the respective measuring device n.

4. The method as claimed in claim 3, wherein the set $\{f(k)\}_{k \in k}$ comprises one or more permutations of mathematical signs and unit prefixes of the measurement signal $P_n(t)$ from the respective measuring device n.

5. The method as claimed in claim 4, wherein the set $\{f(k)\}_{k \in k}$ comprises at least the unit prefixes $-1$, $-10^3$ and $-10^6$ as well as 1, $10^3$ and $10^6$.

6. The method as claimed in claim 3, wherein the set $\{f(k)\}_{k \in k}$ comprises one or more current transformer factors and/or one or more specific thermal capacities.

7. The method as claimed in claim 3, wherein:
the scaling factor $S_n$ associated with one of the measuring devices n (42) is formed by $S_n = \Sigma_{k \in k} x_n(k) \cdot f(k)$; and
$x_n(k)$ is a Boolean selection function that assigns each measuring device n (42) exactly one value $f(k)$ from the set $\{f(k)\}_{k \in k}$ associated with the measuring device n (42).

8. The method as claimed in claim 7, wherein the objective function is extremized using the constraint $\Sigma_{k \in K} x_n(k)=1$, with $x_n(k) \in \{0,1\}$.

9. The method as claimed in claim 7, wherein the selection functions $x_n(k)$ for all measuring devices n (42) are defined by the extremizing of the objective function Z.

10. The method as claimed in claim 1, wherein $Z = \Sigma_{t \in T} |P_{PCC}(t) - \hat{P}_{PCC}(t)|$ is used as the objective function.

11. The method as claimed in claim 10, wherein the absolute value of the difference $|P_{PCC}(t) - \hat{P}_{PCC}(t)|$ is formed by way of two positive error variables $e_{PCC}^{\pm}(t) \geq 0$ through $e_{PCC}^+(t) + e_{PCC}^-(t)$, wherein $P_{PCC}(t) - \hat{P}_{PCC}(t) = e_{PCC}^+(t) - e_{PCC}^-(t)$.

12. The method as claimed in claim 1, wherein an electricity meter or a heat meter is used in each case as measuring device n (42), wherein the measurement signals $P_n(t)$ are formed by time characteristics of the respective powers.

* * * * *